United States Patent Office 3,763,100
Patented Oct. 2, 1973

3,763,100
COATING COMPOSITIONS FROM SOLID EPOXY RESINS AND ADDUCTS OF AZIRIDINE COMPOUNDS WITH POLYEPOXIDES
Patrick Henry Martin and Wesley Joseph Stearns, Jr., Lake Jackson, Tex., assignors to The Dow Chemical Company, Midland, Mich.
No Drawing. Filed Dec. 9, 1971, Ser. No. 206,527
Int. Cl. C08g 30/14
U.S. Cl. 260—47 EN    4 Claims

ABSTRACT OF THE DISCLOSURE

Coating compositions are disclosed which contain
(A) an epoxy-bisphenol adduct having low percent epoxide,
(B) an adduct of an aziridine compound with a polyepoxide, and
(C) optionally a mono-functional secondary amine.
These coatings are particularly useful as primers for metallic substrates.

---

This invention relates to epoxy resin coating compositions and more particularly it relates to stable, one package, epoxy resin coating compositions.

The coating compositions of the present invention comprise (A) a bisphenol-epoxide adduct represented by the general formula:

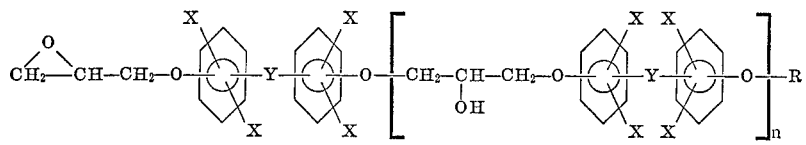

wherein each X is independently hydrogen, chlorine or bromine, R is hydrogen or the

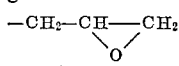

group, each Y is independently a divalent saturated aliphatic hydrocarbon group having from about 1 to about 6 carbon atoms,

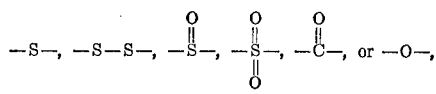

and $n$ is an integer which will provide the adduct with an average molecular weight of from about 3,500 to about 200,000 and above and preferably from about 5,500 to about 25,000, (B) from about 1 to about 40, and preferably from about 5 to about 20, parts by weight per part of (A) of an aziridinyl compound which is an adduct of an aziridine having from about 2 to about 10 carbon atoms and a polyepoxide having more than one vicinal epoxy group, and (C) from about 0 to about 6, preferably from about 0.75 to about 6 and most preferably from about stoichiometric to about 3 active hydrogen equivalents per epoxide equivalent in (A) of a mono-functional secondary amine.

The coating compositions of the present invention when employed as metal primer coatings exhibit unexpectedly improved adhesion between said primer and a subsequent top coat. The storage stability of a composition containing components A, B and C when compared to a composition containing components (A) and (C) but without component (B), is unexpectedly improved without significant loss in physical properties of the resin.

Suitable bisphenol-epoxy adducts which may be employed as component (A) in the coating composition of the present invention include those prepared by reacting a bisphenol such as, for example, p,p'-isopropylidene diphenol (bisphenol A) p,p'-methylenediphenol (bisphenol F), p,p' - isopropylidene di(dibromophenol) mixtures thereof and the like with a diglycidyl ether of a bisphenol such as for example diglycidyl ether of p,p'-isopropylidene diphenol, diglycidylether of p,p'-methylene diphenol, diglycidyl ether of p,p'-isopropylidene di(dibromophenol), mixtures thereof and the like. Such bisphenol-epoxy adducts may also be prepared directly by the reaction of an epihalohydrin with a bisphenol.

Commercially available epoxy-bisphenol adducts which may be employed as component A in the present invention include D.E.R.® 684–EK40, D.E.R.® 686–EK40, Epanol® 55–B40, Bakelite® Phenoxy Resin PKHH and the like.

Suitable mono-functional secondary amines (component C) which may be employed in the present invention are those having from about 2 to about 20 carbon atoms, and preferably from 2 to about 8 carbon atoms, and include, for example, such aliphatic amines as diethyl amine, diisopropylamine, diisopropanol amine, dibutyl amine, dimethyl amine, dimethanol amine, diethanol amine, aromatic amines such as diphenyl amine, mixtures thereof and the like. The short chain, non-branched, secondary amines are most preferred in that they react with the residual epoxy groups in less time and at a lower temperature to thereby impart improved stability to the resin.

Polyaziridinyl adducts having more than one aziridinyl hydroxyalkyl group per molecule comprise one of the components of the coating compositions, component B. Said adduct is conveniently prepared by reacting an alkylenimine with a polyepoxide having more than one glycidyl group per molecule whereby aziridinyl hydroxyalkyl groups are formed.

The reaction between the alkylenimine and the glycidyl group to produce an aziridinyl hydroxy propyl group can be shown with ethylenimine.

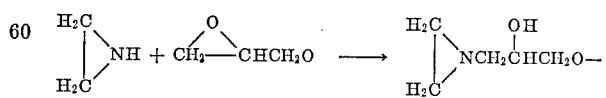

The polyaziridinyl adduct is prepared employing such a reaction by combining at least about one mole of alkylenimine per glycidyl group and heating at moderate temperatures. The reaction is best run in an inert aromatic hydrocarbon solvent such as toluene although other inert solvents or solvent mixtures may be used. Excesses of the alkylenimine to ensure completeness of reaction may be used since the excess alkylenimine may be removed by distillation and/or use of a vacuum and the like. The reaction may take several hours or more depending on the temperature employed. Reaction temperatures in the range of 50 to 80° C. are satisfactory although lower and higher temperatures may be used.

Alkylenimines useful in preparing the polyaziridinyl adducts include ethylenimine and propylenimine which are readily available but other alkylenimines containing an alkyl substitutent of up to 8 carbon atoms may also be used.

Polyepoxides having more than one glycidyl group per molecule may be employed to prepare the polyaziridinyl adducts of this invention. Included within the useful polyepoxides are those wherein the glycidyl group is attached to the resin by an oxygen atom (a glycidyl ether), a sulfur atom (a glycidyl thioether), a carbonyl (a glycidyl ester) and a nitrogen atom (a glycidyl amide or amine). The above polyepoxides and their preparation are well known to the art and are fully disclosed in chapter 2, "Handbook of Epoxy Resins," H. Lee and K. Neville, McGraw-Hill Book Co., New York, 1967.

In general the polyglycidyl ethers of polyhydric alcohols and polyhydric phenols are preferred. Most preferred are the polyglycidyl ethers of dihydric alcohols or dihydric phenols. Resins based on the dihydric phenol, bisphenol A, are the most common resins of this type.

The coating compositions of the present invention are employed as solutions in any compatible solvent or mixture of solvents. The quantity of solvent employed is dependent upon the method used to apply the coating to a suitable substrate, but is usually in the range of from about 20 to about 80 and preferably from about 40 to about 60 percent by weight of the total composition.

Suitable solvents include, for example, the oxygenated solvents such as acetone, methylethylketone, cyclohexanone, diacetone alcohol, mixtures thereof and the like, and the glycol ethers such as ethylene glycol, ethyl ether acetate; ethylene glycol, methyl ether; ethylene glycol, n-butyl ether; diethylene glycol, ethyl ether; diethylene glycol, n-butyl ether; propylene glycol, methyl ether; dipropylene glycol, methyl ether; mixtures thereof and the like. In addition, the solvents may be used in admixture with aromatic solvents such as xylene, toluene, ethylbenzene and the like.

The coating compositions of the present invention may be applied to metal substrates by dipping, spraying, brushing or the like. The coated substrates are then air dried or baked at temperatures of from about 25° to about 400° C. and preferably from about 25 to about 250° C. for from about 5 minutes to about 24 hours to achieve the ultimate physical properties of the coatings. The higher the temperature the shorter the time required to achieve the ultimate properties.

When the compositions of the present invention include a secondary amine (component B), the amine may be added to the epoxy-bisphenol adduct (component A) and reacted therewith to remove any residual epoxide groups at a temperature of from about 25° to about 250° C., preferably from about 25° to about 100° C., until the epoxide content of component A is reduced to essentially zero before adding component C thereto. This provides an improved stability to the resin composition.

The coating compositions which contain no amine (component C) will of necessity be a two component or two package coating system which is mixed together prior to application to a suitable substrate.

The compositions of the present invention may optionally contain pigments, fillers, extenders, flow and leveling agents and the like.

The compositions of the present invention are useful as solution coatings, particularly as metal primer coatings such as, for example, for automobiles, home appliances and the like, but are likewise useful as a coating on organic thermoset polymer substrates such as fiber glass reinforced resinous structures and the like.

The following examples are illustrative of the present invention and are not to be construed as to limiting the scope thereof in any manner.

EXAMPLE 1

Quantities of an aziridine compound were added to two different epoxy resins with and without an amine compound as stabilizer.

In one set of experiments an epoxy resin and a diethyl amine stabilizer were blended and held at room temperature for 2 hours before adding the aziridine compound and in another set of experiments, an epoxy resin and diethyl amine mixture was held at 150° F. for 3 hours before adding the aziridine compound and evaluating the stability of the mixture.

Epoxy resin A was a bisphenol A based epoxy resin solution of 40% non-volatiles in methyl ethyl ketone having an epoxide equivalent weight on a 100% non-volatile basis of about 10,000 indicating a molecular weight of about 20,000 and commercially designated as D.E.R. 684–EK40 which was further diluted to 25% non-volatiles with the monoethyl ether of ethylene glycol i.e. 2-ethoxyethanol.

Epoxy resin B was a bisphenol A based epoxy resin solution of 50% non-volatile in methyl ethyl ketone having an epoxide equivalent weight on a 100% non-volatile basis of 2000 indicating a molecular weight of about 4000 and commercially designated as D.E.R. 667–EK50 which was further diluted to 25% non-volatiles with the monoethyl ether of ethylene glycol.

Aziridine compound A employed was the reaction product of a bisphenol A based polyepoxide having an epoxide equivalent weight of about 230 with ethyleneimine and containing 50% by weight of a solvent mixture containing 80% by weight of xylene and 20% by weight of the monomethyl ether of propylene glycol.

The formulations are given in Table I. The stability results are reported in Tables II and III with the viscosity being reported as Gardner viscosities.

EXAMPLE 2

The formulations of Example 1 were employed as primer coatings onto bonderized steel panels and baked 15 min. at 300° F. They were then topcoated with Rinshed-Mason #R–1199 thermoplastic acrylic paint and baked at 300° F. for 30 minutes.

The panels were then subjected to various tests. The results reported in Table IV are for those formulations wherein the diethyl amine was added and which were aged at room temperature for 2 hours before adding the polyaziridine compound. Table V reports the results obtained from those formulations wherein the diethylamine was added and the mixture was aged for 3 hours at 150° F. before adding the polyaziridine compound.

The Gravelometer test was conducted by the procedure described in Society of Automotive Engineers Technical Report SAE J400 (1968). The size of the chips are designated by a letter with the letter A indicating the smallest chips, B a larger chip, etc. The quantity of chips is designated by a number, the highest number indicating the smallest quantity of chips. The gloss was determined by ASTM D–2457–65T.

The results of the above tests are reported in Tables IV and V.

TABLE I

| Component: | A | B | C | D | E | F | G | H | I | J |
|---|---|---|---|---|---|---|---|---|---|---|
| Epoxy Resin A, parts by wt | 100 | 75 | 75 | | | | | | | |
| Epoxy Resin B, parts by wt | | | | 100 | 90 | 90 | 75 | 75 | 50 | 50 |
| Aziridine Compound A, parts by wt | | 20 | 20 | | 10 | 10 | 25 | 25 | 50 | 50 |
| Diethylamine, parts by wt | | 1.87 | | | 2.21 | | 1.24 | | 1.23 | |

TABLE II

| Time of viscosity determination | A | B | C | D | E | F | G | H | I | J |
|---|---|---|---|---|---|---|---|---|---|---|
| *Gardner viscosity of formulations stored at room temperature* | | | | | | | | | | |
| Initial | H- | D- | D | $A_2$ | $A_2$ | $A_3$ | $A_3$ | $A_3$ | $A_4^+$ | $A_4^+$ |
| After— | | | | | | | | | | |
| 16 hours | H- | D+ | D+ | $A_2$ | $A_2$ | $A_3$-$A_2$ | $A_3$-$A_2$ | $A_3^+$ | $A_3^+$ | $A_3$ |
| 48 hours | H- | E | D+ | $A_2$ | $A_2$-$A_1$ | $A_2$ | $A_2$-$A_1$ | $A_2$ | $A_2$-$A_1$ | $A_2^-$ |
| 72 hours | H- | E-F | E- | $A_2$ | $A_1$ | $A_2$ | $A_1$-A | $A_2^+$ | A- | $A_2^+$ |
| 1 week | H- | I- | E- | $A_2^+$ | B | $A_2$ | (¹) | $A_1^+$ | (¹) | $A^-$ |
| 2 weeks | H- | T-U | E- | $A_2$ | (¹) | $A_1$ | | B- | | D |
| *Gardner viscosity of formulations stored at 150° F.* | | | | | | | | | | |
| Initial | H- | D- | D | $A_2$ | $A_2^-$ | $A_3$ | $A_3$ | $A_3$ | $A_4^+$ | $A_4^+$ |
| After— | | | | | | | | | | |
| 16 hours | H+ | L | E- | $A_2$ | $J^+$ | $A_2$-$A_1$ | (¹) | $A_1$-A | (¹) | $A_1$-A |
| 48 hours | H+ | X | E- | $A_2$ | (¹) | $A_1$ | | A | | A- |
| 72 hours | H+ | $Z_2$ | E | $A_2$ | | $A_1^+$ | | A | | A- |
| 1 week | I+ | (¹) | E+ | $A_2^+$ | | $A_1^+$ | | A | | A |
| 2 weeks | I-J | | F- | $A_2^+$ | | $A_1^+$ | | A-B | | B- |

¹ Gelled.

NOTE.—In the Gardner viscosities as reported above and in subsequent tables, the following is a partial list of the viscosities in order of increasing viscosity: $A_5 < A_4 < A_3 < A_2 < A_1 < A < B < C < D < \ldots Z_1 > Z_2 > Z_3$ etc.

TABLE III

| Time of viscosity determination | C | F | H | J |
|---|---|---|---|---|
| *Gardner viscosity of formulations stored at room temperature* | | | | |
| Initial | C-D | $A_3^-$ | $A_3$ | $A_4$ |
| After— | | | | |
| 16 hours | D | $A_2^-$ | $A_3$-$A_2$ | $A_3$ |
| 48 hours | D | $A_2^-$ | $A_2^-$ | $A_3^+$ |
| 72 hours | D | $A_2$ | $A_2$ | $A_2^-$ |
| 1 week | D+ | $A_2^-$ | $A_1$ | $A_1$ |
| 2 weeks | D+ | $A_1^-$ | $A_1^+$ | $A_1^+$ |
| *Gardner viscosity of formulations stored at 150° F.* | | | | |
| Initial | C-D | $A_5$-$A_2$ | $A_3$ | $A_4^+$ |
| After— | | | | |
| 16 hours | D+ | $A_2$-$A_1$ | $A_1^-$ | $A_2$-$A_1$ |
| 48 hours | D | $A_1^-$ | $A_1^+$ | $A_1^-$ |
| 72 hours | D+ | $A_1$ | $A_1^+$ | $A_1$ |
| 1 week | E- | $A_1$ | $A_1^+$ | $A_1$ |
| 2 week | E+ | $A_1$ | $A_1^+$ | $A_1^+$ |

TABLE IV

| Property | A | B | C | D | E | F | G | H | I | J |
|---|---|---|---|---|---|---|---|---|---|---|
| Primer thickness, mils | .75-.9 | .75-.8 | .7-.8 | .75-.9 | .8-.95 | .75-.9 | .8-.95 | .8-.9 | .75-.9 | .75-.9 |
| Top coat thickness, mils | 1.2-1.4 | 1.4-1.6 | 1.4-1.6 | 1.4-1.5 | 1.4-1.5 | .14-1.6 | 1.3-1.4 | 1.4-1.5 | 1.3-1.4 | 1.4-1.5 |
| Gravelometer test | 1A | 1A | 1A | 1B-1C | 1A | 1A | 1A | 1A-1B | 1B | 1B |
| Gloss | F | G | F | G | F-G | F-G | F-G | F-G | F-G | F-G |
| Holdout | F | F-G | F-G | F | G | F-G | F-G | F-G | F-G | F-G |
| Impact, forward, in.-lbs | 20 | 100 | 50 | 0 | 20 | 20 | 0 | 0 | 0 | 0 |
| Impact, reverse, in.-lbs | All failed 20 in.-lbs | | | | | | | | | |

NOTE.—F=Fair; G=Good.

TABLE V

| Property | C | F | H | J |
|---|---|---|---|---|
| Primer thickness, mils | .7-.8 | .75-.9 | .8-.95 | .75-.9 |
| Top coat thickness, mils | 1.2-1.4 | 1.4-1.6 | 1.4-1.6 | 1.4-1.5 |
| Gravelometer test | 1A | 1A | 1A | 2B |
| Gloss | F-G | F-G | F-G | F |
| Holdout | F | F-G | F-G | F-G |
| Impact, forward, inch-lbs | 50 | 50 | 0 | 0 |
| Impact, reverse, inch-lbs | All failed 20 in.-lbs. | | | |

NOTE.—F=Fair; G=Good.

We claim:

1. A solution coating composition consisting essentially of (A) a bisphenol-epoxide adduct represented by the general formula:

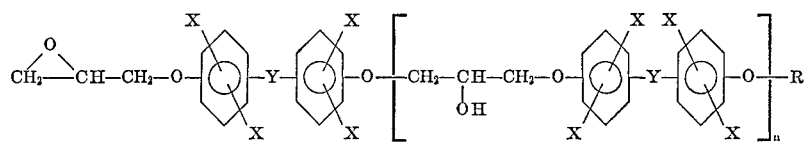

wherein each X is independently hydrogen, chlorine or bromine, R is hydrogen or the

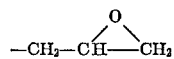

group, each Y is independently a divalent saturated aliphatic hydrocarbon group having from about 1 to about 6 carbon atoms,

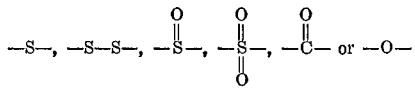

and $n$ is an integer such that will provide the adduct with an average molecular weight of from about 3500 to about 200,000 and above, (B) from about 1 to about 40 parts by weight per part of (A) of an aziridinyl compound which is an adduct of an aziridine having from about 2 to about 10 carbon atoms and a polyepoxide having more than one vicinal epoxy group, and (C) from about 0.75 to about 6 active hydrogen equivalents per epoxide equivalent of (A) of a mono-functional secondary amine.

2. The composition of claim 1 wherein component (A) has an average molecular weight of from about 5500 to about 25,000, component (C) is present in quantities of from about stoichiometric to about 3 active hydrogen equivalents per epoxide equivalent contained in component (A), and component (B) is present in quantities of from about 5 to about 20 parts by weight per part of component (A).

3. The composition of claim 2 wherein component (A) is the reaction product of bisphenol A with the diglycidyl ether of bisphenol A.

4. The coating composition of claim 2 wherein component (A) has been reacted with component (C) to reduce the epoxide content of component (A) to substantially zero prior to the addition of component (B) to the composition.

References Cited

UNITED STATES PATENTS

| 3,329,674 | 7/1967 | Bulbenko et al. | 260—2 X |
| 3,352,809 | 11/1967 | Carlyle et al. | 260—830 X |

WILLIAM H. SHORT, Primary Examiner

T. E. PERTILLA, Assistant Examiner

U.S. Cl. X.R.

117—127, 138.8 R; 260—2 EN, 32.8 EP, 33.2 EP, 33.4 EP, 33.6 EP, 830 R

PO-1050
(5/69)

UNITED STATES PATENT OFFICE
CERTIFICATE OF CORRECTION

Patent No. 3,763,100            Dated October 2, 1973

Inventor(s) Patrick Henry Martin and Wesley Joseph Stearns, Jr.

It is certified that error appears in the above-identified patent and that said Letters Patent are hereby corrected as shown below:

At col. 5 and 6, Table I, delete "JO" and insert --J--.

At col. 5 and 6, Table II, under Formulation A, opposite 1 week for Gardner viscosity of formulations stored at 150°F, delete "I$^+$" and insert --I--.

At col. 5 and 6 under note, change "llst" to --list-- and change "$Z_1 > Z_2 > Z_2$" to --$Z_1 < Z_2 < Z_3$--.

At col. 5 and 6, Table IV, change the topcoat thickness for formulation F from ".14-1.6" to --1.4-1.6--.

Signed and sealed this 5th day of November 1974.

(SEAL)
Attest:

McCOY M. GIBSON JR.            C. MARSHALL DANN
Attesting Officer              Commissioner of Patents